United States Patent [19]

Atkins

[11] Patent Number: 4,554,902
[45] Date of Patent: Nov. 26, 1985

[54] FUEL CONDITIONING DEVICE

[75] Inventor: Walter J. Atkins, Wayne, Mich.

[73] Assignee: Chrysler Corporation, Highland Park, Mich.

[21] Appl. No.: 622,910

[22] Filed: Jun. 21, 1984

[51] Int. Cl.[4] .............................................. F02M 31/00
[52] U.S. Cl. ..................................... 123/557; 123/510
[58] Field of Search ............... 123/557, 543, 548, 522, 123/523, 553, 510, 545, 180 EH; 261/144, 145, DIG. 83, DIG. 81

[56] References Cited

U.S. PATENT DOCUMENTS

| 973,880 | 10/1910 | Ranney | 123/510 |
|---|---|---|---|
| 1,269,787 | 6/1918 | Church . | |
| 1,368,186 | 2/1921 | Morgan | 123/557 |
| 1,671,388 | 5/1928 | Van Hise | 123/510 |
| 1,676,751 | 7/1928 | Van Hise | 123/510 |
| 1,676,811 | 7/1928 | Van Hise | 123/510 |
| 2,231,525 | 2/1941 | Breitling | 123/557 |
| 2,323,525 | 7/1943 | Ebel . | |
| 2,565,767 | 8/1951 | Gaskill | 123/522 |
| 2,745,394 | 5/1956 | Holley | 123/548 |
| 4,020,811 | 5/1977 | Laforce | 123/548 |

FOREIGN PATENT DOCUMENTS 299187  7/1932  Italy .................................... 261/144

Primary Examiner—Ronald H. Lazarus
Attorney, Agent, or Firm—Kenneth H. MacLean, Jr.

[57] ABSTRACT

In combination with a vehicle powered by an internal combustion engine mounted within a relatively enclosed engine compartment, an engine fuel conditioning apparatus for heat conditioning fuel prior to flow into the carburetor, the fuel conditioner being located at the uppermost portion of the engine compartment and adjacent the carburetor so that the fuel therein is exposed to the maximum temperature conditions in the engine compartment to pre-heat fuel prior to flowing into a heated carburetor thereby preventing fuel foaming which adversely richens the fuel-air ratio to the engine.

3 Claims, 3 Drawing Figures

FUEL CONDITIONING DEVICE

BACKGROUND OF THE INVENTION

Modern automobile engines typically are compactly enclosed within engine compartments that are poorly ventilated when the engine is inoperative. Consequently, cooling the engine and the air around the engine with the engine compartment becomes ever more difficult and average temperatures therein have increased with each new model car. Resultantly, high engine compartment temperatures increase the difficulty in restarting an engine after a sustained hot soak period. The hot soak refers to the period of time during which a heated engine is de-energized and, thus, the cooling fans and other engine cooling components are also de-energized. The result is a greatly increased engine compartment temperature. Upon attempting to restart the engine, fuel entering the abnormally hot engine carburetor tends to foam or percolate, which action grossly affects the fuel-air ratio of the engine. In fact, the foaming of the fuel in the carburetor often causes the fuel-air ratio to be too rich for engine starting.

This problem of fuel foaming in the carburetor subsequent to a hot soak is discussed in SAE Paper 821202 entitled "Carburetor Foaming and Its Influence On The Hot Weather Performance of Motor Vehicles." The authors are V. M. Tertois and B. D. Caddock of Shell Research Limited. Two hot fuel handling problems are discussed in the paper and are often confused with one another. One, and the most well known problem, is that of vapor lock in the fuel pump. Vapor lock results from excessive vapor generation due to overheating of the pump. Vapor lock inhibits the replenishment of liquid fuel in the carburetor bowl and will cause engine starving. Vaporization of the light hydrocarbons are a primary cause of vapor lock. Many patents relate to devices for preventing vapor lock and some are listed hereafter.

The second, but less well known, hot fuel handling problem results when fuel foams in a hot carburetor. Normally, this foaming of fuel occurs after a hot soak period in which engine compartment temperatures are increased substantially above normal. When fuel is pumped from a relatively cool fuel tank and into an abnormally hot carburetor, gasoline foams and will tend to block the carburetor bowl vent. This causes fuel to flow through the carburetor and into the throttle bore in an unmetered and undesirable fashion. The result is an overly rich fuel-air mixture which may prevent restarting of the engine after the hot soak. Various suggestions are made to solve this problem in the SAE Paper 821202, none of which are totally satisfactory in most circumstances.

The subject application discloses a simple fuel conditioning device which provides for a significant quantity of fuel to be exposed to the hot test location in the engine compartment. The device is located in the hottest portion of the engine compartment which is just beneath the engine hood and near the carburetor. Upon restarting an engine after a hot soak, the heat conditioned fuel in the fuel conditioning device flows into a relatively hot carburetor, but the fuel will not percolate or foam as would relatively cool fuel which flows into a hot carburetor. The quantity of fuel in the fuel conditioning device is sufficient to start the engine and operate it for a suffient time after a hot soak to evacuate hot air from the engine compartment primarily by use of the engine fan.

Consequently, an object of the present invention is to provide a fuel conditioning device and system for vehicle engines which will temperature condition a quantity of fuel sufficiently to start and run the engine after a prolonged hot soak period.

A further object of the present invention is to provide a fuel conditioning device and system for a vehicle engine within a relatively confined engine compartment thereby subject to large temperature increases during a hot soak period of engine inactivity, the fuel conditioning device and system including a heat conductive fuel reservoir adjacent the carburetor and located in the uppermost and hottest part of the engine compartment to provide a supply of high temperature fuel to flow into a relatively hot carburetor upon restart after the hot soak period.

Further objects and advantages of the present invention will be more readily understood, reference being had to the accompanying drawings in which a preferred embodiment is illustrated. In the drawings.

DETAILED DESCRIPTION OF THE PREFERRED EMBODIMENT

Figure 1:
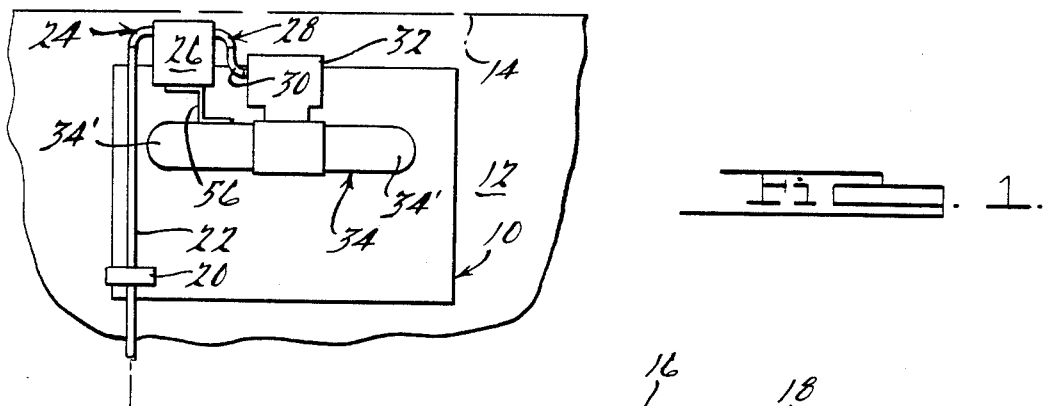
FIG. 1 is a fragmentary and relatively schematic view of an engine within an engine compartment attached by a fuel line to a fuel tank located elsewhere in the vehicle.

In FIG. 1, a side view of a vehicle engine 10 is illustrated. The engine 10 is positioned in an engine compartment 12, as schematically shown. The upper wall of the compartment 12 is defined by a hood or engine hatch cover 14. The engine 10 may be transversely mounted in a vehicle such as is common with front wheel drive vehicles such as the Chrysler K Body cars or the new 1984 Chrysler minivans. The engine 10 may also be conventionally mounted in a longitudinal orientation with respect to the vehicle.

The engine 10 shown in FIG. 1 is a conventional internal combustion type spark ignited engine. Fuel is delivered to the engine through a fuel line 16 from a fuel tank 18. The fuel tank 18 may be located rearwardly of the engine and normally beneath the floor level of the vehicle. Fuel line 16 extends into the engine compartment 12 and is connected to the inlet of a fuel pump 20 normally located at a lower portion of the engine. The outlet of the fuel pump 20 is connected via fuel conduit 22 to an inlet fitting 24 of the subject fuel conditioning device 26. The device 26 has an outlet 28 connected by a fuel conduit 30 to the inlet of a carburetor 32. The carburetor 32 receives the fuel from the conditioning device 26 in a bowl portion thereof. The carburetor then delivers an air-fuel mixture into an intake manifold 34. The intake manifold 34 includes multiple branch portions 34 which individually connect to the valved intake passage or introduction portions of the engine cylinder head for the purpose of introducing the air-fuel mixture into the engine's combustion chambers.

Figure 2:
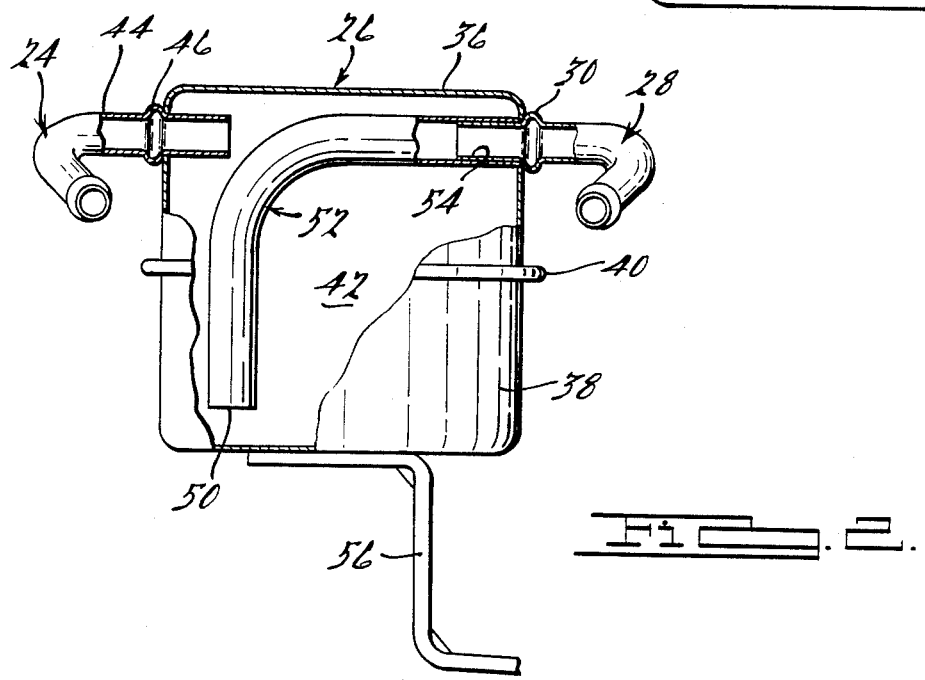
FIG. 2 is an elevational sectioned view of the fuel conditioning device shown in FIG. 1.

In FIG. 2, an enlarged view of the subject fuel conditioning device 26 is illustrated. The container 26 is formed by mated upper and lower cup-shaped metal housing portions 36 and 38 respectively. The two cup-shaped members 36, 38 have peripheral flange portions which are mated together at 40 to form a hollow thin-walled enclosure member with an interior 42. Fuel from the fuel pump 20 is introduced through the inlet 24 of the thin-walled container 26 through inlet tube 44. Inlet tube 44 has an expanded annular portion 46 seating against the wall of member 36. An interior outlet end portion 48 extends into the enclosure's interior 42 to discharge fuel in a radial direction. As previously indicated, fuel within the interior 42 is subjected to the extreme temperature environment of the engine compartment due to its location therein, as well as the totally exposed heat conducting side walls of the device.

Figure 3:
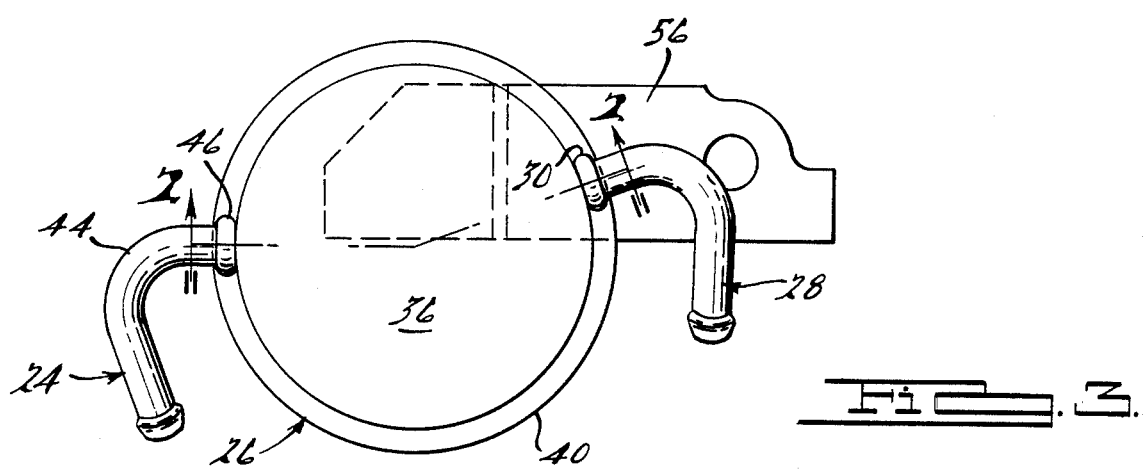
FIG. 3 is a planar sectioned view of the fuel conditioning device shown in FIG. 1.

Fuel is withdrawn from lower portion of interior 42 through exterior inlet end 50 of an elbow-shaped pick-tube 52. The interior end of the tube 52 telescopically receives an interior portion 54 of outlet 28. Like member 24, an annular bulge 30 seats against the outer surface of the member 36. Both members 24 and 28 are preferably fixed to the upper housing 36 by a mechanical crimp expansion and/or by brazing. The outlet tube 28 is attached to conduit 30 to direct fuel into the float bowl of the carburetor 32. In FIG. 3, the top planar view of the fuel conditioning device 26 shows the orientation of the inlet member 24, the outlet member 26, and the bracket 56. Bracket 56 is connected at one end to the lower housing 38 and at the other end to the manifold or some other convenient support portion on the engine.

As previously specified, the fuel conditioning device 26 is located at the uppermost portion of the engine compartment 12 where the hottest temperature conditions are found. High temperatures are anticipated at this location particularly after a hot soak during which a fully heated engine is de-energized. Resultantly, cooling air is not available to evacuate the engine compartment. Subsequent to a hot soak period, starting a vehicle engine will normally introduce relatively cool fuel into a hot carburetor bowl absent a fuel conditioner. This will cause the fuel in the hot carburetor to percolate or foam. Fuel will actually be forced into the intake manifold. Consequently, the engine may not start because of too rich a mixture. The subject fuel conditioning device produces a reservoir of relatively heated or high temperature conditioned fuel for introduction into the carburetor for a limited period of time which is sufficient to start the engine and decreases the compartment temperatures.

The gasoline foaming in a hot carburetor subsequent to hot soak has been previously recognized as a problem and is discussed in the aforementioned SAE Paper 821202. In the paper, no effective solutions to gasoline foaming were suggested other than to provide adequate ventilation of the engine compartment during a hot soak period. This suggestion requires costly fan controls and has some disadvantages. The use of the subject fuel conditioner is an economical and effective solution.

Therefore, the subject application hereafter claims a fuel conditioning device and system for a vehicle to solve hot fuel handling problems as previously described. The invention is particularly pointed out and distinctly claimed in the following claims which define the invention.

I claim:

1. In a vehicle with a carbureted internal combustion engine positioned within a substantially enclosed engine compartment, the upper walled surface of which is defined by an engine compartment hood means, the compartment characterized by limited air circulation through the engine compartment for cooling when a hot engine is de-energized resulting in a high engine compartment temperature increase, wherein the improvement comprises a fuel heat conditioning device and system for restarting the engine, comprising:
    a source of liquid fuel including a carburetor bowl within the engine compartment and a fuel tank outside the engine compartment and a fuel line extending therebetween;
    a hollow, thin-walled enclosure means within the engine compartment having a sufficient volume for engine starting and located beneath the upper walled surface of the hood means and adjacent the engine carburetor, the fuel passing through said fuel line and said enclosure being heated by no other heat source other than the air circulating in the engine compartment.

2. The fuel conditioning device and system set forth in claim 1 in which the volume of the enclosure means is almost 54 cm$^3$.

3. The fuel conditioning device and system set forth in claim 1 in which the enclosure means is a thin-walled metal member with a thickness of about one millimeter.

* * * * *